(12) United States Patent
Harrison et al.

(10) Patent No.: US 11,034,474 B2
(45) Date of Patent: Jun. 15, 2021

(54) DUAL PURPOSE SEAL HEAD ASSEMBLY, TRAY SEALING SYSTEM, AND METHOD THEREFOR

(71) Applicant: ROSS INDUSTRIES, INC., Midland, VA (US)

(72) Inventors: William Lee Harrison, Culpeper, VA (US); Andrew William Jones, Remington, VA (US); David McAuley Alexander, Purcellville, VA (US); Gary Scott Liles, Ruckersville, VA (US)

( * ) Notice: Subject to any disclaimer, the term of this patent is extended or adjusted under 35 U.S.C. 154(b) by 720 days.

(21) Appl. No.: 15/607,974

(22) Filed: May 30, 2017

(65) Prior Publication Data

US 2018/0118389 A1 May 3, 2018

Related U.S. Application Data

(60) Provisional application No. 62/414,925, filed on Oct. 31, 2016.

(51) Int. Cl.
*B65B 31/02* (2006.01)
*B65B 7/16* (2006.01)
(Continued)

(52) U.S. Cl.
CPC .............. *B65B 31/02* (2013.01); *B29C 65/18* (2013.01); *B29C 65/305* (2013.01); *B29C 65/7847* (2013.01); *B29C 66/005* (2013.01); *B29C 66/0014* (2013.01); *B29C 66/00145* (2013.01); *B29C 66/112* (2013.01); *B29C 66/131* (2013.01); *B29C 66/53461* (2013.01); *B29C 66/7392* (2013.01); *B29C 66/8322* (2013.01); *B29C 66/8432* (2013.01); *B62B 3/0625* (2013.01); *B65B 7/2878* (2013.01); *B65G 67/20* (2013.01); *B66F 9/12* (2013.01); *B29C 66/919* (2013.01); *B29L 2031/7164* (2013.01);
(Continued)

(58) Field of Classification Search
None
See application file for complete search history.

(56) References Cited

U.S. PATENT DOCUMENTS 4,878,985 A * 11/1989 Thomsen ................ B29C 53/40
156/459
5,024,675 A * 6/1991 Stackpool ......... H01M 10/3909
29/623.1
(Continued)

FOREIGN PATENT DOCUMENTS

WO WO2014/166940 10/2014
WO 2015011076 A1 1/2015
(Continued)

OTHER PUBLICATIONS

International Search Report for PCT/US2017/059193 dated Jan. 5, 2018.

*Primary Examiner* — Hemant Desai
*Assistant Examiner* — Tanzim Imam
(74) *Attorney, Agent, or Firm* — Patrick Stanzione; Stanzione & Associates, PLLC

(57) ABSTRACT

A seal head assembly includes a plurality of heat seal plates defining a corresponding plurality of heating areas, each heat seal plate including a heating element to independently control the temperature of the corresponding heating area.

14 Claims, 5 Drawing Sheets

(51) Int. Cl.
B65B 7/28 (2006.01)
B62B 3/06 (2006.01)
B65G 67/20 (2006.01)
B66F 9/12 (2006.01)
B29C 65/30 (2006.01)
B29C 65/00 (2006.01)
B29C 65/18 (2006.01)
B29C 65/78 (2006.01)
B65B 51/10 (2006.01)
B29L 31/00 (2006.01)
B65B 11/52 (2006.01)
B65B 47/10 (2006.01)

(52) U.S. Cl.
CPC .............. *B65B 7/164* (2013.01); *B65B 11/52* (2013.01); *B65B 47/10* (2013.01); *B65B 2051/105* (2013.01)

(56) References Cited

U.S. PATENT DOCUMENTS

| | | | | |
|---|---|---|---|---|
| 5,331,791 | A * | 7/1994 | Fux | B65B 61/18 53/373.7 |
| 5,666,788 | A * | 9/1997 | Tolson | B65B 51/303 53/442 |
| 5,673,534 | A * | 10/1997 | Fowler | B29C 65/18 493/194 |
| 5,715,645 | A * | 2/1998 | Fukuda | B29C 65/18 53/374.6 |
| 5,775,065 | A * | 7/1998 | Tolson | B65B 61/06 53/372.3 |
| 7,422,045 | B2 | 8/2008 | Polster | |
| 9,186,874 | B1 * | 11/2015 | Bezanilla | B29C 66/8432 |
| 2004/0139701 | A1 * | 7/2004 | Cady | B29C 65/7461 53/434 |
| 2005/0044814 | A1 * | 3/2005 | Patterson | B65B 31/046 53/432 |
| 2006/0147588 | A1 * | 7/2006 | Garwood | B65D 81/2076 426/392 |
| 2008/0295461 | A1 * | 12/2008 | Parmley | B65B 57/12 53/461 |
| 2010/0287881 | A1 * | 11/2010 | Ehrmann | B65B 7/164 53/170 |
| 2011/0061344 | A1 * | 3/2011 | Ehrmann | B29C 51/422 53/453 |
| 2011/0083803 | A1 * | 4/2011 | Henry | B32B 37/02 156/308.2 |
| 2012/0198797 | A1 | 8/2012 | Spillner et al. | |
| 2013/0255852 | A1 * | 10/2013 | Payne | B65B 7/164 156/64 |
| 2013/0295461 | A1 | 10/2013 | Payne | |
| 2014/0331611 | A1 * | 11/2014 | Meyer | B29C 66/112 53/445 |
| 2015/0191267 | A1 * | 7/2015 | Mochizuki | B65H 29/005 53/373.2 |
| 2015/0217884 | A1 * | 8/2015 | Zwaga | B32B 38/0012 206/557 |
| 2015/0259086 | A1 | 8/2015 | Ahn et al. | |
| 2017/0241401 | A1 * | 8/2017 | Smith | B29C 66/532 |
| 2017/0305071 | A1 * | 10/2017 | Kawaguchi | B29C 66/81871 |
| 2017/0305586 | A1 * | 10/2017 | Rizzi | B65B 31/028 |
| 2018/0297730 | A1 * | 10/2018 | Ehrmann | B29C 66/00145 |
| 2019/0055040 | A1 * | 2/2019 | Capitani | B65B 41/16 |

FOREIGN PATENT DOCUMENTS

| | | | |
|---|---|---|---|
| WO | WO2016/055598 | 4/2016 | |
| WO | WO-2016055599 A1 * | 4/2016 | ............. B29C 66/13 |

* cited by examiner

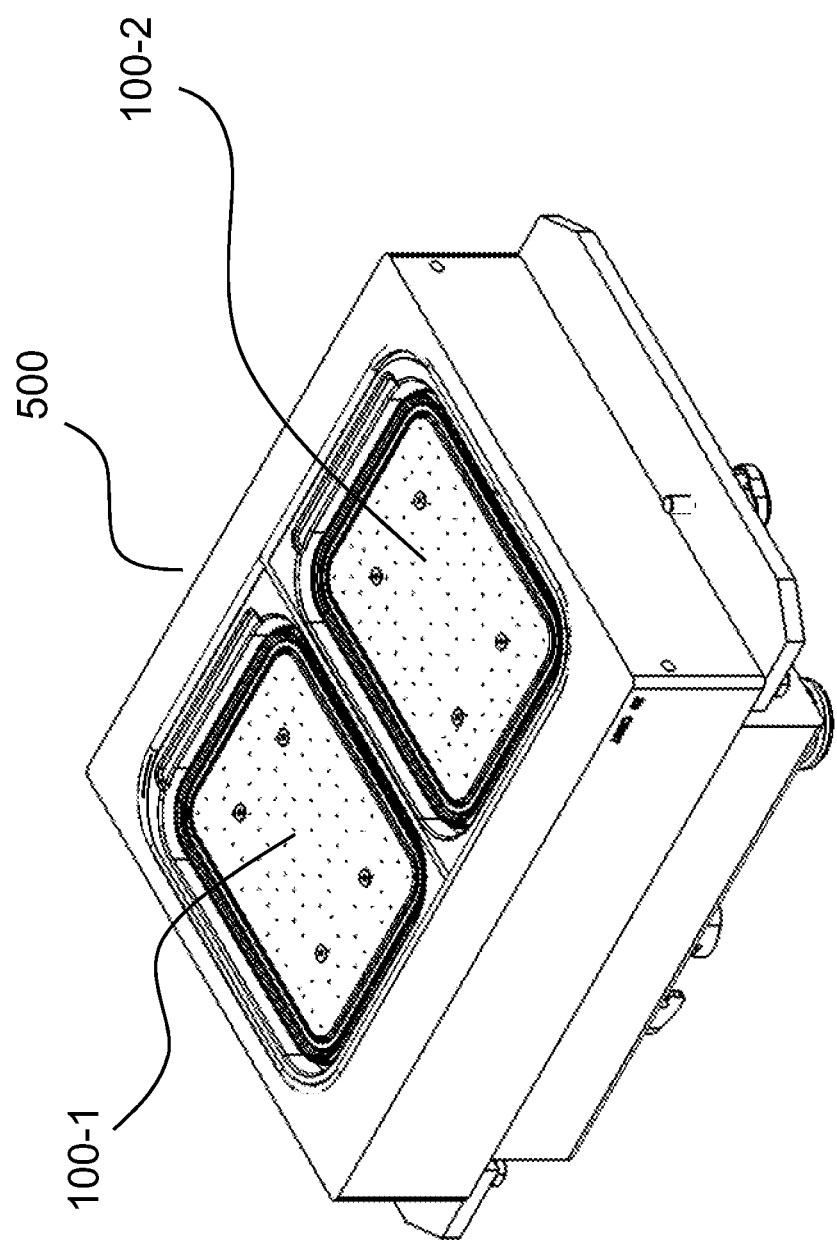

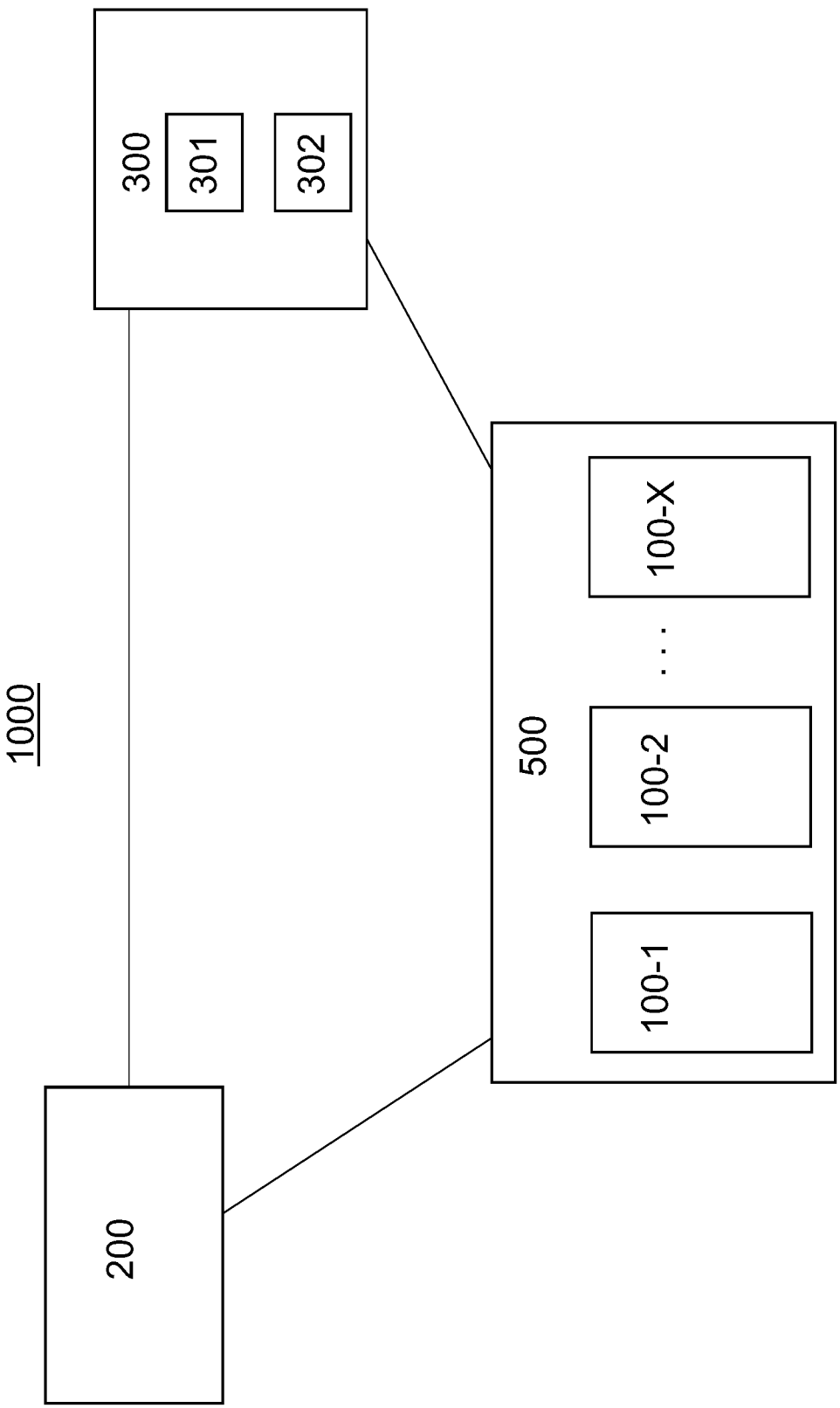

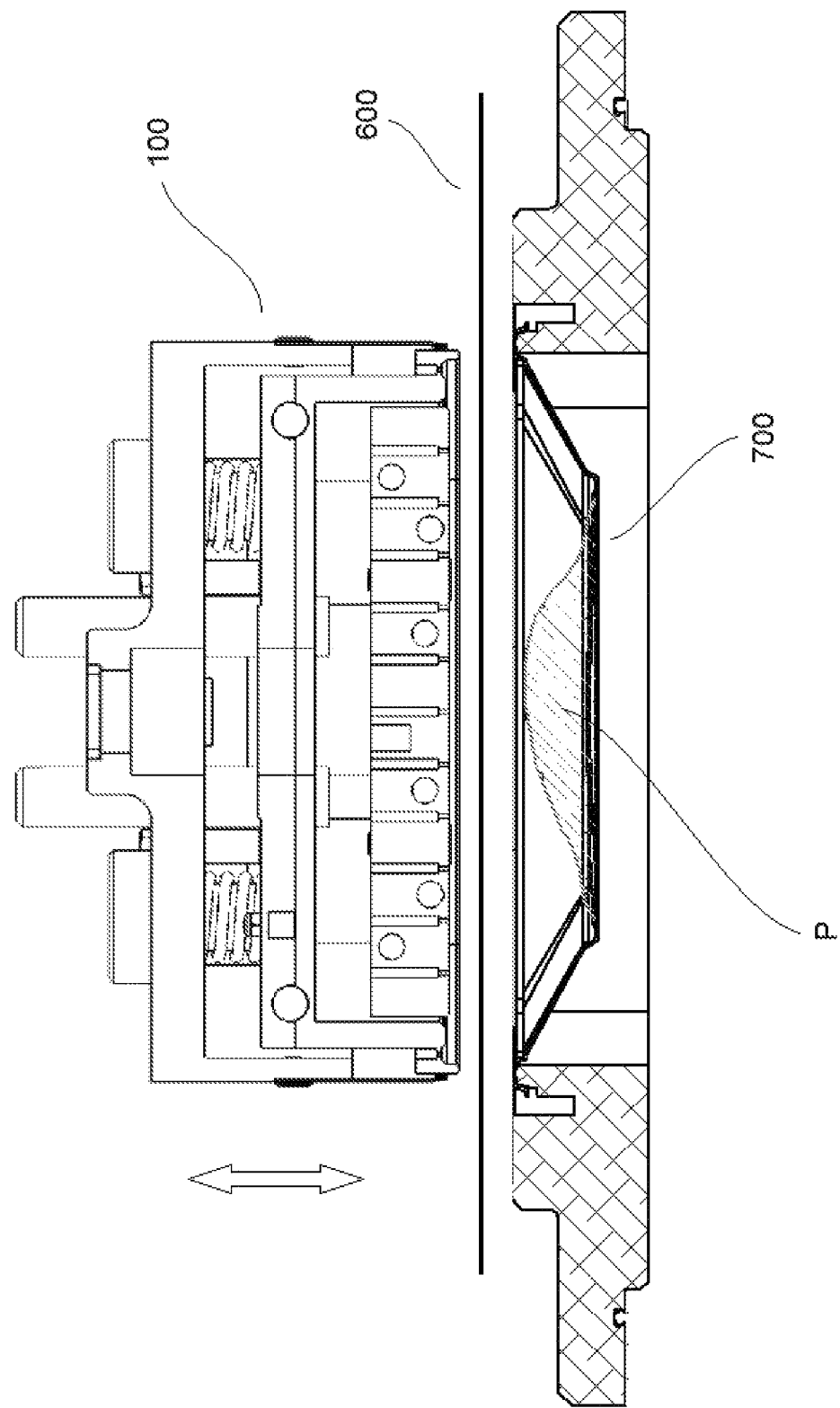

DUAL PURPOSE SEAL HEAD ASSEMBLY, TRAY SEALING SYSTEM, AND METHOD THEREFOR

CROSS-REFERENCE TO RELATED APPLICATIONS

This application claims priority from Provisional Application No. 62/414,925, filed on Oct. 31, 2016, in the United States Patent and Trademark Office, the disclosure of which is incorporated herein in its entirety by reference.

BACKGROUND OF THE INVENTIVE CONCEPT

Many modern products, especially food products, are commonly packaged in preformed trays and then covered in plastic film. This packaging process protects products from contamination, allows easy organization of different products in one package, and additionally increases the shelf life of perishable products.

Two commonly known methods of packaging products are Modified Atmosphere Packaging, or MAP, and Vacuum Skin Packaging, or VSP. These two methods are as follows:

MAP is a process of changing the content of the atmosphere around a product prior to sealing the product in plastic. In this process, the oxygen content of the air around the product can be lowered from about 21% (the oxygen content of the Earth's atmosphere at sea level) to about 0%, for example by flushing the atmosphere around the product with a replacement gas such as nitrogen. Due to the lowered oxygen content, oxidation reactions and the spread of aerobic microorganisms inside of the package can be substantially reduced. The result is an increase in shelf life for the packaged product.

VSP is a process by which the air pressure around the product is significantly reduced prior to sealing the product in plastic. The air pressure may be reduced from about 1000 millibars (the air pressure of the Earth's atmosphere at sea level) to, e.g., 10 millibars. This reduced pressure pulls plastic film down onto the preformed tray and/or the product held thereon. Due to the greatly reduced air pressure inside of the package and resulting decrease in oxygen and microorganisms, the packaged product's shelf life is increased.

MAP and VSP are used on different products, and also require different processes to package products. Importantly, MAP and VSP use significantly different temperatures. A MAP packaging system may use temperatures of, e.g., 150-300° F., while a VSP packaging system may use temperatures of, e.g., 400° F. As a result of the differences between MAP and VSP, conventionally available packaging machines may be configured for MAP or for VSP, but cannot be configured for both processes at once.

As a result, a manufacturer charged with packaging different products under MAP and VSP processes is forced to retool their tray sealing machines according to the specific packaging process of the products. This retooling can take significant time and greatly impact the efficiency of the packaging process. Furthermore, the more frequently a machine needs to be retooled, the more likely it is the machine will be damaged or retooled incorrectly, leading to further loss of efficiency.

SUMMARY OF THE INVENTION

It is therefore a primary object of the present invention to provide a system, apparatus, and method which improves upon prior art packaging systems, machines, and processes as described above, and addresses their related drawbacks.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a seal head assembly, including a plurality of heat seal plates defining a corresponding plurality of heating areas, each heat seal plate comprising a heating element to independently control the temperature of the corresponding heating area.

In an exemplary embodiment, at least one of the plurality of heat seal plates includes a plurality of vents to pump air in or out.

In an exemplary embodiment, at least one of the plurality of heat seal plates includes a cooling element to selectively reduce the temperature of the corresponding heating area independently of other heating areas.

In an exemplary embodiment, the seal head assembly may include a set of cutters to cut plastic film.

The foregoing and/or other features and utilities of the present general inventive concept may also be achieved by providing a tray sealing system, including a tool set comprising at least one seal head assembly, the at least one seal head assembly including a plurality of heat seal plates defining a corresponding plurality of heating areas, each heat seal plate comprising a heating element to independently control the temperature of the corresponding heating area, and a controller to control operations of the tool set.

In an exemplary embodiment, the tray sealing system further includes an air pump to pump air in or out of the at least one seal head assembly, and the controller controls operations of the air pump.

In an exemplary embodiment, the controller includes a storage device to store one or more recipes, each recipe including instructions to control the operation of the tool set.

In an exemplary embodiment, the controller includes a user interface to select a stored recipe, and the controller controls the operation of the tool set according to the selected recipe.

The foregoing and/or other features and utilities of the present general inventive concept may also be achieved by providing a method of sealing products on preformed trays using a seal head assembly, the method including independently controlling the temperature of a plurality of heating areas in the seal head assembly.

In an exemplary embodiment, the method further includes receiving a selection of a recipe from among a plurality of stored recipes, the selected recipe including instructions to control the heating areas, and independently controlling the temperature of the plurality of heating areas according to the selected recipe.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates an isometric view of a Tool Set according to an exemplary embodiment of the present general inventive concept;

FIG. 4 is a block diagram of a tray sealing system according to an exemplary embodiment of the present general inventive concept; and FIG. 5 illustrates a side view of a Seal Head Assembly 100 in the tray sealing system 1000 according to an exemplary embodiment of the present general inventive concept.

DETAILED DESCRIPTION OF THE PREFERRED EMBODIMENTS

Figure 1:
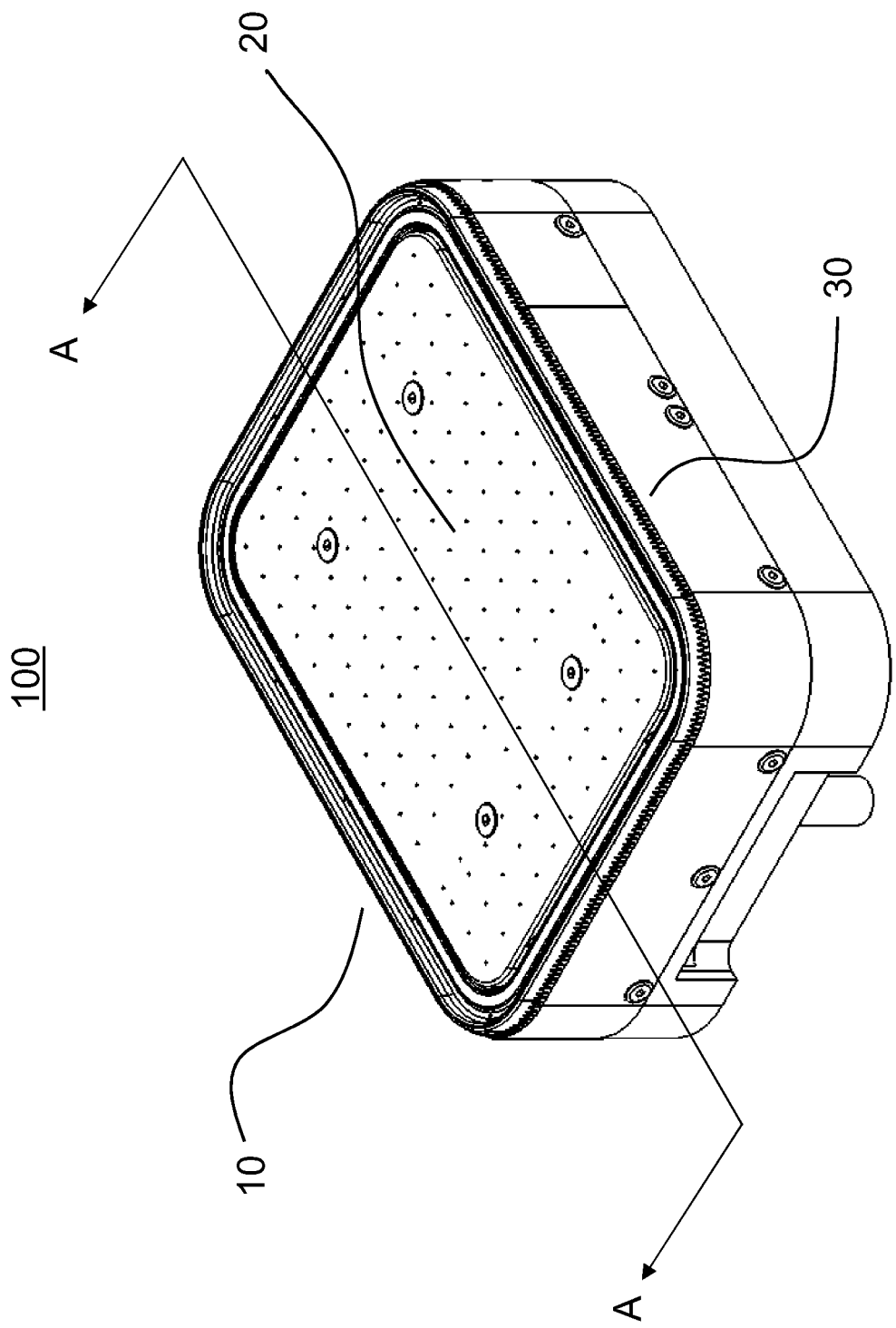
FIG. 1 illustrates an isometric view of a Seal Head Assembly according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the preferred embodiments. Thus, the terms used herein are defined based on the intended meaning of the terms together with the description throughout the specification.

Also, when a part "includes" or "comprises" an element, unless there is a particular description contrary thereto, the part can further include other elements, not excluding the other elements.

For the purposes of this application, the following terms are defined:

A "Heat Seal Plate" is a temperature controlled plate in a tray sealing machine.

A "Seal Head Assembly" is a set of internal components, for example heating and cooling elements, which includes at least one Heat Seal Plate.

A "Tool Set" is a complete set of components in a tray sealing machine which are used to seal a batch of preformed trays. One or more Seal Head Assemblies may be included in a Tool Set, each Seal Head Assembly corresponding to one of the preformed trays.

A "Recipe" is a stored set of defined settings to control operations of a tray sealing machine.

Hereinafter, one or more exemplary embodiments of the present general inventive concept will be described in detail with reference to accompanying drawings.

Exemplary embodiments of the present general inventive concept provide a dual purpose Tool Set 500 used in a tray sealing machine 1000 (illustrated in FIGS. 3 and 4). The Tool Set 500 is capable of sealing products P on trays 700 (illustrated in FIG. 5) with both MAP and VSP with only a Recipe change for the tray sealing machine 1000. For the purposes of this application, "product" includes any material or object which may be sealed onto a preformed tray 700 via MAP or VSP processes. "Product" may include objects of different sizes and consistencies. For example, mashed potatoes and steak may both be "product."

The Tool Set 500 comprises one or more Seal Head Assemblies 100-1, 100-2 . . . 100-X, each Seal Head Assembly 100 including a plurality of heat seal plates defining a corresponding plurality of heating areas. An example of such a Seal Head Assembly 100 including heat seal plates is illustrated in FIG. 1. As illustrated therein, a Seal Head Assembly 100 according to an exemplary embodiment of the present general inventive concept may be generally rectangular in shape. During a packaging process illustrated in FIG. 5, a tray 700 containing product P is placed under the Seal Head Assembly 100 and a plastic film 600 is suspended over the tray 700. The tray 700 that the product P is sealed onto may have dimensions approximately equal to those of the Seal Head Assembly 100. Accordingly, a tray 700 to be used with the exemplary embodiment of the Seal Head Assembly 100 illustrated in FIG. 1 may be generally rectangular in shape.

As illustrated in FIG. 1, an exemplary embodiment of the Seal Head Assembly 100 may include an Outer Heat Seal Plate 10 around the perimeter of the Seal Head Assembly 100, and a Center Heat Seal Plate 20 in the interior of the Seal Head Assembly 100, i.e., the portion of the Seal Head Assembly 100 away from the perimeter. These heat seal plates 10, 20 accordingly define two heating areas, one around the perimeter of the Seal Head Assembly 100 and another in the interior of the Seal Head Assembly 100. These defined heating areas correspond to similar locations on a tray 700 of product P to be sealed by the Seal Head Assembly 100. The temperatures of the outer heat seal plate 10 and the center heat seal plate 20 may be independently controlled, allowing for different temperatures in the corresponding heating areas.

A Seal Head Assembly 100 according to exemplary embodiments of the present general inventive concept may also include blades or cutters 30. These cutters 30 may define an outer perimeter of the Seal Head Assembly 100, and may be used to cut the plastic film 600 which is stretched over tray 700 containing product P and sealed onto the tray 700 via MAP or VSP processes. By cutting the plastic film 600 with cutters 30, product P may be fully packaged and moved out of a tray sealing machine 1000 including Seal Head Assembly 100, thereby allowing new trays 700 to be moved into the tray sealing machine 1000 to be packaged.

A Seal Head Assembly 100 according to an exemplary embodiment of the present general inventive concept may also include a plurality of holes or vents 22 to pump air in or out of the tray sealing machine 1000. These vents 22 are specifically useful in VSP processes, in which the plastic film 600 may be preheated to be pliable, and furthermore this film 600 may be suspended over a near-vacuum (e.g., 10 millibars) prior to being sealed onto the product P and the tray 700. Accordingly, after a plastic film 600 is positioned between the Seal Head Assembly 100 and the tray 700 containing product P during a VSP process, the vents 22 may be used to draw air in and hold the plastic film 600 in place against the Seal Head Assembly 100 while the near-vacuum is formed over the tray 700 holding the product P. For example, as illustrated in FIG. 1, a Seal Head Assembly 100 may include a plurality of the vents 22 which may be connected to, e.g., an air pump 200 (illustrated in FIG. 4), to allow air to be pumped out and hold the plastic film 600 in place during preheating and while a near-vacuum is formed around the product P to be sealed and packaged. The vents 22 thereby help to enable a VSP process. In an exemplary embodiment of the present general inventive concept, the vents 22 may also be used to force air against the plastic film 600, pushing the plastic film 600 against the tray 700 and product P after the near-vacuum is formed. Forcing the plastic film 600 against the product P and tray 700 in this manner may ensure a strong seal.

Figure 2:
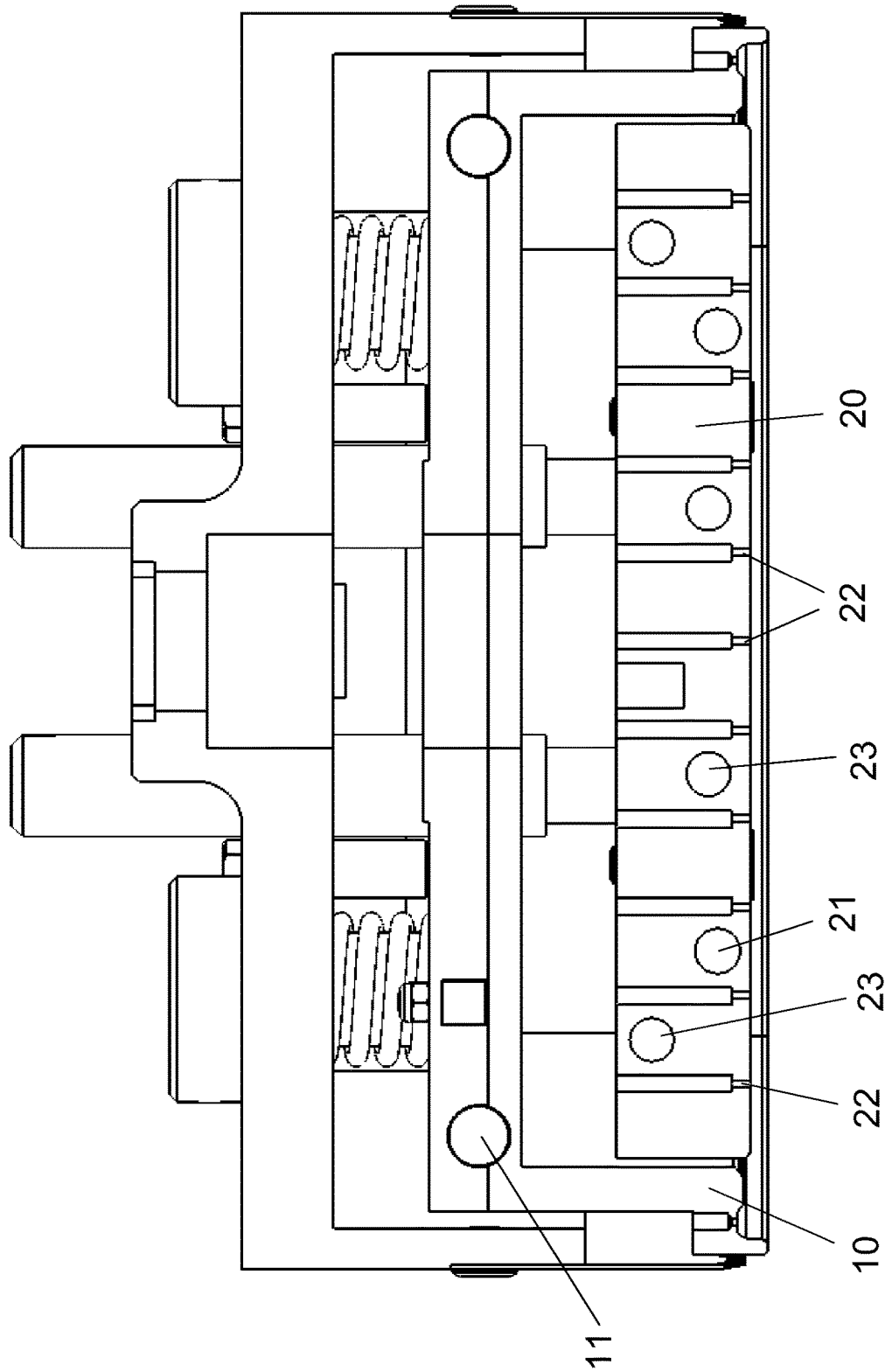
FIG. 2 illustrates a sectional view of a Seal Head Assembly according to an exemplary embodiment of the present general inventive concept, seen along line A-A illustrated in FIG. 1.

FIG. 2 is a sectional view of a Seal Head Assembly 100 according to an exemplary embodiment of the present general inventive concept, seen along line A-A illustrated in FIG. 1. As illustrated therein, an outer heat seal plate 10 may include an outer heating element 11. Likewise, the center heat seal plate 20 may include a center heating element 21. The heating elements 11 and 21 may be, for example, electric heaters or other similar devices used to raise the temperature of an object. According to the exemplary embodiments illustrated in FIGS. 1 and 2, the center heat seal plate 20 may include one or more of the vents 22, as well as one or more cooling elements 23. It will be understood that either or both of the outer heat seal plate 10 and center heat seal plate 20 may include one or more of the vents 22 and one or more cooling elements 23. Cooling elements 23 may comprise, for example, liquid cooling units, heat sinks, or other similar devices used to lower the temperature of an object.

As illustrated in FIG. 3, a Tool Set 500 according to an exemplary embodiment of the present general inventive concept may include a plurality of Seal Head Assemblies 100-1 to 100-X, which may be installed alongside one another inside of a tray sealing machine 1000. Each Seal Head Assembly 100 may be used to package product P on a corresponding preformed tray 700, as illustrated in FIG. 5. By using a plurality of Seal Head Assemblies 100, a tray sealing machine 1000 may package a corresponding plurality of trays 700 at once. During operation, the Tool Set 500 is closed around a set of trays 700, e.g., lowered onto trays to form an airtight space around the trays 700. The trays 700 are then packaged according to the selected process. As part of this packaging, plastic film 600 may be sealed onto the trays 700 and cut by the cutters 30 of each of the Seal Head Assemblies 100. This operation is described in greater detail infra with reference to FIG. 5.

The temperature of all of the heating areas in the Tool Set 500 can be set depending on the specific application or Recipe. According to an exemplary embodiment of the present general inventive concept, each of the plurality of heating areas of each Seal Head Assembly 100 may be independently heated to a different temperature. In the exemplary embodiment of the present general inventive concept illustrated in FIG. 2, heating elements 11 and 21 of outer heat seal plate 10 and center heat seal plate 20, respectively, allow for independent heating of the outer heat seal plate 10 and center heat seal plate 20. One or more of the heat seal plates (for example, center heat seal plate 20) may also include one or more of the cooling elements 23 (illustrated in FIG. 2), to allow the temperature of the corresponding heating area(s) to be both raised and lowered according to the immediate application or Recipe. In a MAP process, for example, a plastic film 600 is suspended between the Seal Head Assembly 100 and the tray 700 containing product P prior to packaging (illustrated for example in FIG. 5). When a replacement gas (e.g., nitrogen or a tri-gas) is injected into the tray sealing machine 1000 to reduce the oxygen content around the product P to be packaged, this injection may push the plastic film 600 against the Heat Seal Plates. Accordingly, during a MAP process, the center heat seal plate 20 may be cooled via cooling element(s) 23 to minimize heat transfer to the plastic film 600 and thereby avoid damaging the plastic film 600 prior to sealing the product P.

It will be understood that including cooling elements 23 in one or both of the outer heat seal plate 10 and the center heat seal plate 20 also allows a greater variation in temperature between the heating areas of a Heat Seal Plate 100 according to an exemplary embodiment of the present general inventive concept. For example, if a Recipe calls for the outer heat seal plate 10 to be heated to, e.g., 300° F., and the center heat seal plate to be heated to, e.g., 150° F., this difference in temperatures may cause heat transfer from the outer heat seal plate 10 to the center heat seal plate 20 by their relative proximity in the Seal Head Assembly 100. As a result, the center heat seal plate 20 may be unintentionally heated above its target temperature. Cooling elements 23 in the center heat seal plate 20 therefore allow a user to compensate for such unwanted heat transfer, and maintain the center heat seal plate 20 at a desired temperature irrespective of the temperature of the outer heat seal plate 10. It will be understood that this example is not meant to be limiting. Cooling elements 23 may be included in the outer heat seal plate 10 instead of the center heat seal plate 20. Alternatively, all heat seal plates (e.g., outer heat seal plate 10 and center heat seal plate 20) may both include cooling elements 23.

FIG. 4 illustrates a tray sealing system 1000, which may also be called a tray sealing machine, according to an exemplary embodiment of the present general inventive concept. As illustrated therein, the tray sealing system 1000 may include a Tool Set 500 which includes a plurality of Seal Head Assemblies 100-1 to 100-X. Although three Seal Head Assemblies 100 are illustrated in FIG. 4, it will be understood that any number of Seal Head Assemblies 100 may be included in the Tool Set 500.

As illustrated in FIG. 4, the tray sealing system 1000 may include a controller 300, for example a computer. The controller 300 controls the operation of the tray sealing machine 1000, including the temperatures of the heating areas of each Seal Head Assembly 100 in the Tool Set 500. More specifically, the controller 300 controls the heating elements 11, 21 and cooling elements 23 such that the corresponding heat seal plates 10, 20 are brought to a temperature specified in a Recipe. The controller 300 may also control the operation of an air pump 200, which in turn may be connected to the Tool Set 500 to pump air in and out of the Seal Head Assemblies 100.

The controller 300 may include a storage device 301 to store one or more Recipes. The storage device 301 may be, for example, a computer hard drive, a flash drive, or any device capable of storing Recipes. The storage device 301 may alternatively not be physically included within the controller 300, and may instead be, for example, a server or cloud storage system that the controller 300 accesses remotely.

The controller 300 may further include a user interface 302 to allow a user to input commands to the controller 300 and thereby control the operation of the tray sealing machine 1000. The user interface 302 may be, for example, one or more of a keyboard, a mouse, a monitor, a touchscreen, or other known device or combination of devices to input commands.

According to exemplary embodiments of the present general inventive concept, a user may select a Recipe according to the specific product(s) P being packaged and the specific packaging process (MAP or VSP) being used. The controller 300 may then control the tray sealing machine 1000 according to the selected Recipe. In this manner, a tray sealing machine 1000 according to an exemplary embodiment of the present general inventive concept may be used for both MAP and VSP packaging processes without needing to change the Tool Set 500. This may significantly increase the efficiency of the packaging process.

The controller 300 may also be used to receive and store new Recipes. A new Recipe may be downloaded to the storage device 301 from an external device, e.g., a flash drive, cloud storage, etc. Alternatively, a Recipe may be input directly via the user interface 302 of the controller 300. This allows for a great degree of customization in the operation of the tray sealing machine 1000. Regardless of how the Recipe is entered into the controller 300, it may be stored in storage device 301 for later recall and use. A Recipe may be selected and implemented according to a user command entered at the user interface 302.

A Recipe according to an exemplary embodiment of the present general inventive concept includes the instructions necessary for the controller 300 to control the tray sealing machine 1000 to package products P. A Recipe may include the settings for the specific temperature of each of the heating areas (e.g., outer heat seal plate 10 and center heat seal plate 20) of each Seal Head Assembly 100-1 to 100-X, as well as the timing of heating and/or cooling the heating areas. A Recipe may also include the timing and operation of other elements of the Seal Head Assembly 100, including, for example, instructions to control the air pump 200 to pump air in or out via the vent holes 22, and at what pressure the air is pumped in or out. The Recipe may also include instructions for operation of the Tool Set 500 during packaging, including, for example, when plastic film 600 is advanced into the tray sealing machine 1000 to be sealed onto trays 700 including product P, when the Tool Set 500 is closed around trays 700 to package the product P, and when the plastic film 600 is cut by cutters 30 to finalize the packaging.

A Tool Set 500 according to an exemplary embodiment of the present general inventive concept may be operated differently according to different Recipes, without needing to be re-tooled. In other words, the same Tool Set 500 may perform both MAP and VSP operations.

FIG. 5 illustrates a side view of a Seal Head Assembly 100 in the tray sealing system 1000 according to an exemplary embodiment of the present general inventive concept. The Seal Head Assembly 100 illustrated in FIG. 5 may be identical to that illustrated in FIGS. 1 and 2, and so a description of its components is not repeated here. As illustrated in FIG. 5, the Seal Head Assembly 100 (included in a Tool Set 500 as illustrated in FIG. 3) may be positioned over a tray 700 containing product P. A plastic film 600 may be suspended between the Seal Head Assembly 100 and the tray 700. Although the tray 700 illustrated in FIG. 5 tapers in cross-section, it will be understood that the area of the tray 700 (i.e., width and length) at a point of contact with the Seal Head Assembly 100 may approximately match the corresponding dimensions of the Seal Head Assembly 100.

In operation, after the tray 700 and film 600 are positioned in the tray sealing system 1000, the Seal Head Assembly 100 may then be lowered onto the tray 700, thereby forming an airtight space around the tray 700. The plastic film 600 is pressed against the tray and may be sealed onto the tray 700 via a packaging process, e.g., VSP or MAP. After sealing, the plastic film 600 may be cut by cutters 30 to remove excess film and finalize the sealing process. The Seal Head Assembly may thereafter be lifted away from the tray 700, allowing the packaged tray 700 to be moved out of the tray sealing system 1000.

The arrangement illustrated in FIG. 5, including the plastic film 600 suspended between the Seal Head Assembly 100 and the tray 700, may be used for both VSP and MAP processes. According to exemplary embodiments of the present general inventive concept, only the settings of the Seal Head Assembly, including the temperature of the outer heat seal plate 10, the temperature of the center heat seal plate 20, and the use of vents 22, need to be changed between VSP and MAP processes.

According to an exemplary embodiment of the present general inventive concept, in a MAP application the outer heat seal plate 10 may be set to 300° F., while the center heat seal plate 20 may be cooled to 150° F. When a replacement gas (e.g., nitrogen or a tri-gas) is pumped into the tray sealing machine 1000, heat transfer between the center heat seal plate 20 and the plastic film 600 is minimized due to the cooling of the center heat seal plate 20.

According to an exemplary embodiment of the present general inventive concept, in a VSP application the outer heat seal plate 10 may be set to 400° F. and the center heat seal plate 20 may be heated to 400° F. Vents 22 in the Seal Head Assembly 100 may be used to draw out air and thereby draw a preheated plastic film 600 towards the outer and center heat seal plates 10, 20 while a near-vacuum is formed around the product P to be packaged. These same vents 22 may also be used to force air against the plastic film 600, thereby pushing the plastic film 600 onto the product P and tray 700 after the near-vacuum is formed.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

What is claimed is:

1. A seal head assembly, comprising:
    a plurality of independent and separate heat seal plates defining a corresponding plurality of heating areas, each heat seal plate comprising a discrete heating element and a discrete cooling element to independently control a temperature of the corresponding heating area, the plurality of heat seal plates being independent and separate from each other such that transference of heat between each heating area is prevented.

2. The seal head assembly of claim 1, wherein at least one of the plurality of heat seal plates includes a plurality of vents to pump air in or out.

3. The seal head assembly of claim 1, further comprising a set of cutters to cut plastic film.

4. A tray sealing system, comprising:
a tool set comprising at least one seal head assembly, the at least one seal head assembly comprising a plurality of independent and separate heat seal plates defining a corresponding plurality of heating areas, each heat seal plate comprising a discrete heating element and a discrete cooling element to independently control a temperature of the corresponding heating area, the plurality of heat seal plates being separate from each other such that transference of heat between each heating area is prevented; and
a controller to control operations of the tool set, the controller including a plurality of product packaging process recipes which determine temperatures of each of the plurality of heating areas.

5. The tray sealing system of claim 4, further comprising:
an air pump to pump air in or out of the at least one seal head assembly,
wherein the controller further controls operations of the air pump.

6. The tray sealing system of claim 4, wherein the controller comprises a storage device for storing the plurality of product packaging process recipes, each recipe comprising instructions to uniquely control the operations of the tool set.

7. The tray sealing system of claim 6, wherein:
the controller comprises a user interface to select one of the stored product packaging process recipes; and
the controller controls the operations of the tool set according to the selected recipe.

8. A method of sealing products on preformed trays using a seal head assembly, the method comprising:
independently controlling heating and cooling of a plurality of independent and separate heating areas in the seal head assembly using a plurality of independently controlled and discrete heating elements and a plurality of independently controlled and discrete cooling elements of the seal head assembly such that each of the plurality of heating areas are independently heated and cooled and transference of heat between each of the heating areas is prevented.

9. The method of claim 8, further comprising:
receiving a selection of a recipe from among a plurality of stored product packaging process recipes, the selected product packaging recipe comprising instructions to control the heating areas; and
independently controlling the temperature of the plurality of heating areas according to the selected product packaging recipe.

10. A seal head assembly, comprising:
a first heat seal plate configured to correspond with a shape of an opening in a food sealing tray, the first heat seal plate comprising:
a first heating element to heat a heating area of the first heat seal plate to a selected temperature within a range of selectable temperatures; and
a first cooling element to quickly cool the first heat seal plate; and
a second heat seal plate separate from and surrounding an outer periphery of the first heat seal plate such that transference of heat between the first and second heat seal plates is prevented, the second heat seal plate comprising:
a second heating element to heat a heating area of the second heat seal plate to a selected temperature within a range of selectable temperatures, the selected temperature of the second heat seal plate being independent of the selected temperature of the first heat seal plate; and
a second cooling element to cool the second heat seal plate separate from the first heat seal plate.

11. The seal head assembly of claim 10, wherein the first and second heat seal plates each comprises a plurality of vent holes, and wherein air can be selectively pumped in and out of the vent holes of the first heat seal plate and the vent holes of the second heat seal plate.

12. The seal head assembly of claim 11, further comprising a set of cutters surrounding an outer perimeter of the second heat seal plate to cut a film heated to a food sealing tray by the second heat seal plate.

13. A method of sealing products on preformed trays using a seal head assembly, the method comprising:
controlling a temperature of an outer periphery of the seal head assembly using a first discrete heating element and a first discrete cooling element;
controlling a temperature of an inner portion of the seal head assembly independently of controlling the temperature of the outer periphery of the seal head assembly, using a second discrete heating element and a second discrete cooling element; and
pumping air selectively out of or into the outer periphery of the seal head assembly while simultaneously pumping air selectively out of or into the inner portion of the seal head assembly.

14. The method of claim 13, further comprising:
receiving a selection of an electronic control recipe from among a plurality of stored recipes, the selected recipe comprising instructions to control pumping of air into and out of the outer periphery of the seal head assembly and the inner portion of the seal head assembly and instructions to control the temperatures of the outer periphery of the seal head assembly and the inner portion of the seal head assembly independently.

* * * * *